United States Patent [19]
Gage et al.

[11] Patent Number: 5,147,675
[45] Date of Patent: Sep. 15, 1992

[54] PROCESS FOR MAKING EXTRUSION COOKED SNACK CHIPS

[75] Inventors: Dennis R. Gage, Cincinnati; Richard W. Lodge, Mt. Healthy; Stephen R. Cammarn, Cincinnati; Vincent Y. Wong, Westchester, all of Ohio

[73] Assignee: The Procter & Gamble Company, Cincinnati, Ohio

[21] Appl. No.: 762,042

[22] Filed: Sep. 18, 1991

Related U.S. Application Data

[60] Continuation of Ser. No. 356,818, May 24, 1989, which is a division of Ser. No. 38,400, Apr. 15, 1987, abandoned.

[51] Int. Cl.$^5$ .................................................. A23L 1/10
[52] U.S. Cl. .................................... 426/549; 426/439; 426/516; 426/808
[58] Field of Search ................ 426/439, 549, 516, 808

[56] References Cited

U.S. PATENT DOCUMENTS

| | | |
|---|---|---|
| 3,150,978 | 9/1964 | Campfield . |
| 3,368,902 | 2/1968 | Berg . |
| 3,502,479 | 3/1970 | Singer et al. . |
| 3,666,511 | 5/1972 | Williams et al. . |
| 3,682,652 | 8/1972 | Corbin et al. . |
| 3,703,379 | 11/1972 | Cummisford et al. . |
| 3,851,084 | 11/1974 | Rossen et al. . |
| 3,864,505 | 2/1975 | Hunter et al. . |
| 3,886,291 | 5/1975 | Willard . |
| 3,927,222 | 1/1975 | Rosenquenst et al. . |
| 3,937,848 | 2/1976 | Campbell et al. . |
| 3,956,517 | 5/1976 | Curry et al. . |
| 3,998,975 | 12/1976 | Liepa . |
| 4,096,791 | 6/1978 | Weiss et al. . |
| 4,126,706 | 11/1978 | Hilton . |
| 4,157,204 | 5/1985 | Mottur et al. . |
| 4,219,580 | 8/1980 | Torres . |
| 4,221,842 | 9/1980 | Taft . |
| 4,379,782 | 4/1973 | Staub et al. . |
| 4,517,204 | 5/1985 | Mottur et al. . |
| 4,568,550 | 2/1986 | Fulger . |
| 4,568,557 | 2/1986 | Becker et al. . |
| 4,645,679 | 2/1987 | Lee . |
| 4,756,920 | 7/1988 | Willard . |
| 4,778,690 | 10/1988 | Sadel et al. . |
| 4,834,996 | 5/1989 | Fazzolare et al. . |
| 4,876,101 | 10/1989 | Willard . |

FOREIGN PATENT DOCUMENTS

| | | |
|---|---|---|
| 0186245 | 2/1986 | European Pat. Off. . |
| 0236288 | 9/1987 | European Pat. Off. . |
| 2035393 | 4/1971 | Fed. Rep. of Germany . |
| 1306384 | 7/1973 | United Kingdom . |
| 1321889 | 7/1973 | United Kingdom . |
| 2178637 | 2/1987 | United Kingdom . |

OTHER PUBLICATIONS

Bazua et al. "Extruded Corn Flour as an Alternative to Lime-Heated Corn Flour for Tortilla Preparation", Journal of Food Science, vol. 44, pp. 940-941, 1979.

Molina, M. R., Letona, M., Bressani, R., "Drum Drying for the Improved Production of Instant Tortilla Flour", Journal of Food Science, vol. 42, No. 6, pp. 1432-1434, 1977.

APV Baker, Inc. "Complete Systems for Breakfast Cereal Production" (Manufacturing Pamphlet). For ease of reference, Applicant has placed numbers on pages of copy sent to Examiner.

Werner & Pfleiderer, "Continuous Twin-Screw Processing—Future Oriented Technology" (Manufacturing pamphlet).

Snack Food Technology, 2nd Edition, pp. 30-32, 166-169, 205-207 (Matz), 1984.

Chem. Abstract No.1 223908u, vol. 104, No. 25, Jun. 1986 (Abstract only).

Primary Examiner—Jeanette Hunter
Assistant Examiner—Mary S. Mims
Attorney, Agent, or Firm—Richard C. Witte; Ronald L. Hemingway; Rose Ann Dabek

[57] ABSTRACT

Extrusion-cooked snack chips, comprising from about 65% to about 90% by weight of cereal material, from about 10% to about 35% by weight of fat, and from about 0.2% to about 3.0% by weight of water. A process for producing these chips is also disclosed.

12 Claims, 2 Drawing Sheets

PROCESS FOR MAKING EXTRUSION COOKED SNACK CHIPS

This is a continuation of application Ser. No. 356,818, filed on May 24, 1989, which is a division of application Ser. No. 038,400 filed on Apr. 15, 1987, now abandoned.

FIELD OF INVENTION

This invention relates to ceral-based extrusion-cooked snack chips having a light, crunchy texture. Compositions and process conditions for producing these chips are also disclosed.

BACKGROUND OF THE INVENTION

As described by Matz, *Snack Food Technology*, conventional corn chip processes begin with a corn meal or corn masa. Both white and yellow corn kernels of the dent type are added to a vat containing water and a proportionate amount of lime. The mixture is heated to the boiling point, the heat is cut off, and the contents of the vat are allowed to stand undisturbed for up to 10 to 20 hours. During this heating and steeping stage, the corn hulls are hydrated and partially hydrolyzed. This softens the hulls to a jelly-like consistency and they are easily removed and discarded later in the process. Some of the starch in the corn also becomes gelatinized. By the end of the steeping period, the corn kernels have absorbed about 50% by weight water. The hulls are removed in a washer by jets of water which also remove excess lime. The washed kernels are then normally, but not necessarily, transferred to a stone mill where they are ground into dough or masa. The masa is formed (usually by hand) into large loaves and then fed into hydraulically powered extrusion presses. To produce a more tender product, relatively low amounts of work input are used to form the dough pieces from the loaves. The cylindrical chamber of the press contains a closely fitting piston which forces the dough through a die plate having a series of slot-like ports about ½ inch (1.27 cm) wide, a cutting device severs the extruded strands into pieces, usually about 1½ inch (3.81 cm). In the alternative, the dough can be rolled out into thin sheets from which shapes can be cut. In either case, the dough pieces travel directly into cooking oil held at about 375° F. (190.6° C.). After the moisture content has been reduced to a few percent, the chips are removed from the oil, salted, cooled, and packaged.

Conventional processes for producing corn chips, similar to that described above, have the disadvantage of producing chips that are hard, gritty, and do not easily melt in the mouth.

Several patents disclose corn chips made with various additives.

For example, U.S. Pat. No. 3,368,902 to Berg discloses a process for making corn chips in which ground corn or masa is cooked until substantially full gelatinization of all corn starch occurs before frying. In a preferred embodiment extra corn starch and carboxymethylcellulose are added to the dough after cooking but before frying. The advantages are said to be improved texture and reduced oil absorption. Calcium hydroxide at a 1.0% to 1.5% level based on dry corn is said to bring out greater corn flavor. Emulsifiers are not disclosed.

U.S. Pat. No. 4,645,679 to Lee et al. discloses the production of corn chips having potato chip-like texture. This is accomplished by combining ground hydrated corn with a starch material, extruding the mixture into a dough, and frying. The resultant chip is said to have moderate corn taste, yet have a texture that is light and crisp.

U.S. Pat. No. 4,219,580 to Torres discloses the use of edible, non-digestible flour substitutes such as microcrystalline cellulose in baked goods to reduce the caloric value of those goods. Also disclosed is the use of emulsifiers such as lecithin, glycerol derivatives (for example, glycerol monoesters, partially acetylated glycerol monoesters, mono-and diglyceride mixtures, partially acetylated mono- and diglycerides, and polyglycerol monoesters), lactylated fatty acids, and sorbitan derivatives. Preferred emulsifiers are lecithin, mono-diglyceride mixtures, sodium steroyl-2-lactylate and triglycerol monostearate. No disclosure is made for use in corn chips.

U.S. Pat. No. 4,517,204 to Mottur et al. discloses a process for the production of puffed snack foods in which coated microcrystalline cellulose is added to the dough prior to puffing in the ratio of meal or flour to cellulose of from about 9:1 to about 3:1. Emulsifiers, such as lecithin, and mono- and diglycerides can be added from about 0.1% to about 1.0% by weight to improve expansion of the final product. The cooking stage is carried out in an extruder to form collets which expand upon frying or baking.

U.S. Pat. No. 4,502,479 to Singer et al. discloses a process for producing snack food products in which a pregelatinized starch (potato is preferred, and only potato, rice and wheat are disclosed) is mixed with water and an emulsifying gel containing saturated monoglycerides.

U.S. Pat. No. 4,568,557 to Becker et al. discloses snack food products containing high dietary fiber contents. A fat-based coating is applied to the dietary fibers to aid as a binder, protect the fibers from excess moisture, to aid in dough processing, and mask any undesirable textural quality associated with the fibers. The coating can contain emulsifiers. Specifically disclosed emulsifiers are lecithin and mono- and diglycerides.

U.S. Pat. No. 4,568,550 to Fulger et al. discloses extrusion cooking of flour-based doughs. Use of sodium steroyl-2-lactylate and glyceryl monostearate as conditioning agents is disclosed. Also disclosed, but not exemplified, is the possible inclusion of cellulose or other dietary fibers.

U.S. Pat. No. 3,998,975 to Liepa discloses doughs made from dehydrated potatoes that contain 0.4% to 1.0% monoglycerides to improve the texture of the reconstituted mash.

It is an object of this invention to produce unique cereal-based snack chips having a high degree of crispness and crunchiness without sacrificing textural lightness.

It is another object of this invention to produce cereal-based snack chips which are lower in fat and higher in fiber than traditional snack chips.

It is another object of this invention to describe various emulsifiers and combinations of emulsifiers which when incorporated into a cereal-based composition produce a unique snack chip that is texturally light yet more crunchy than snack chips with comparable lightness.

It is another object of this invention to describe an absorbent material which, when incorporated into a cereal-based composition, improves crunchiness in the final chip.

It is still another object of this invention to describe process conditions by which the cereal-based composition and the resultant chips can be produced.

These and other objects will become apparent by the description of the invention below.

SUMMARY OF THE INVENTION

The present invention relates to extrusion-cooked, cereal-based snack chips, and to intermediate compositions and process conditions for producing those snack chips. The snack chips are lower in fat, higher in fiber, and are preferably uniformly shaped so that they are evenly stacked and packaged.

The final fried product comprises from about 65% to about 90% by weight of cereal-based material, from about 10% to about 35% by weight of the fat, and from about 0.2% to about 3.0% by weight of water. The chips can additionally comprise an emulsifier, an absorbent material, and an alkaline material. Minor ingredients which can also be included are sugars, flavorings, and colorings.

The intermediate compositions comprise from about 60% to about 90% by weight of cerear material, said cereal material having been subjected to extrusion cooking time and temperatures sufficient to provide at least about 60% gelatinization of the starch in the cereal, and from about 10% to about 40% by weight water. The compositions can additionally comprise from about 0.03% to about 1.0% by weight of an emulsifier selected from the group consisting of distilled mono- and diglycerides, succinylated monoglycerides, diacetyl tartaric acid esters of monoglycerides, polyglycerol esters of fatty acids, fatty acid esters of sucrose, and mixtures thereof. Furthermore, the compositions can additionally comprise up to about 1.0% of an absorbent material, described in detail below, which contributes to the crunchiness of the resultant chip; and an alkaline component selected from the group consisting of carbonates, bicarbonates, phosphates, and hydroxides of sodium, potassium, and calcium, and mixtures thereof, which alkaline component contributes to the flavor of the resultant chip. Particularly well-suited process conditions for processing the compositions and producing the unique snack chips are also disclosed.

BRIEF DESCRIPTION OF THE FIGURES

FIG. 1 is a cross-sectional view at 75X magnitude of the physical structure of a Dorito ® brand snack chip. A scale bar of 100 microns is shown in the lower portion of the Figure.

FIG. 2 is a cross-sectional view at 75X magnitude of the physical structure of a Tostito ® brand snack chip. A scale bar of 100 microns is shown in the lower portion of the Figure.

DETAILED DESCRIPTION OF THE INVENTION

The present invention relates to the production of novel, unique snack chips having a crisp and crunchy, yet light texture. The snack chips are lower in fat, and higher in fiber than traditional snack chips. Furthermore, they are preferably uniformly shaped for easy stacking and packaging.

One aspect of the present invention is the disclosure of compositions useful in making snack chips that are texturally light, yet crisp and crunchy. Another aspect of the present invention is the disclosure of process conditions particularly well-suited to process the compositions and produce chips that are texturally light, yet crisp and crunchy.

Texture

Snack chip texture has three distinct attributes: crispness, crunchiness, and lightness.

An important component of the texture of snack chips is the initial crispness. As used herein, "crispness" relates to the sensations from the initial bite into the chip. An example of a food which is crisp is a fresh piece of celery. An example of a food which is not crisp is a properly baked potato. A cereal-based snack chip is generally more desirable the more crisp it is.

Another key component of the texture of snack chips is crunchiness. As used herein, "crunchiness" relates to the manner in which the chip particles reduce in size during chewing. Crunchiness can also be thought of as the ability of the chip to maintain crispness during subsequent mastication after the initial bite. An example of a food which is crisp and crunchy is a rippled or thick potato chip. An example of a food which is crisp but quickly loses its crunch is an apple. A cereal-based snack chip is generally more desirable with an increased level of crunchiness. A chip that quickly loses its crunchy attributes, i.e. becomes mush as it is chewed, is less desirable.

A third key component of the texture of snack chips is lightness, or stated conversely, heaviness. As used herein, "heavy" and "light" relate to the ease or difficulty of reducing the chips in size during mastication. A heavier food requires more effort to chew than a lighter food. A heavier food is sometimes referred to as "tougher", "more dense" or "more filling." Another way to describe heaviness and lightness is to use the terms "lubricity" and "mouthmelt." A food that breaks up in the mouth quickly and easily is considered more lubricious and has a faster rate of mouthmelt than a food that requires much time and effort to masticate. Typical corn chips have a low degree of lubricity. Due to their dense, thick-walled structure, they do not melt easily in the mouth, and in spite of their high fat content, do not become soft and mushy upon chewing.

Figure 1:
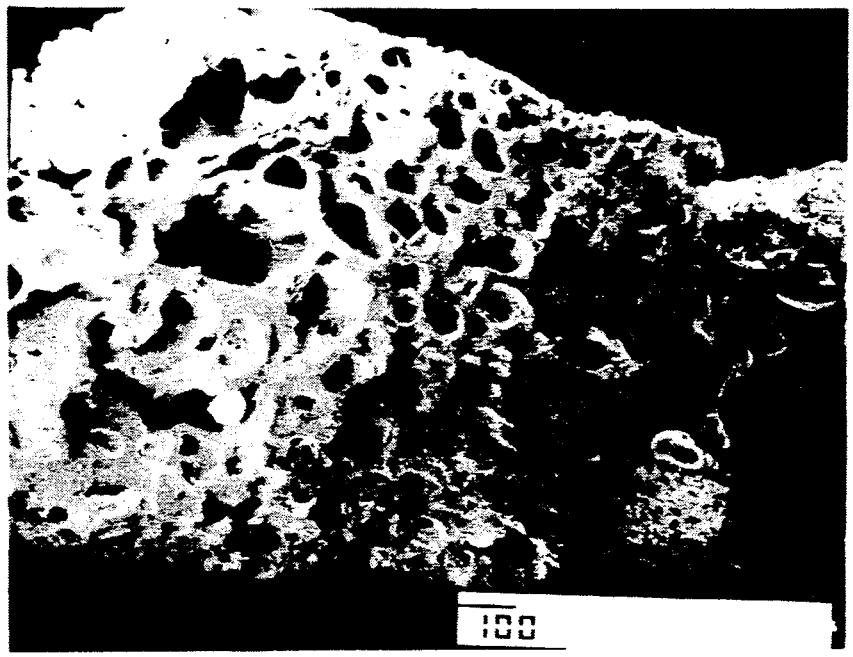
FIGS. 1 and 2 are cross-sectional views of conventional corn chips.
Figure 2:
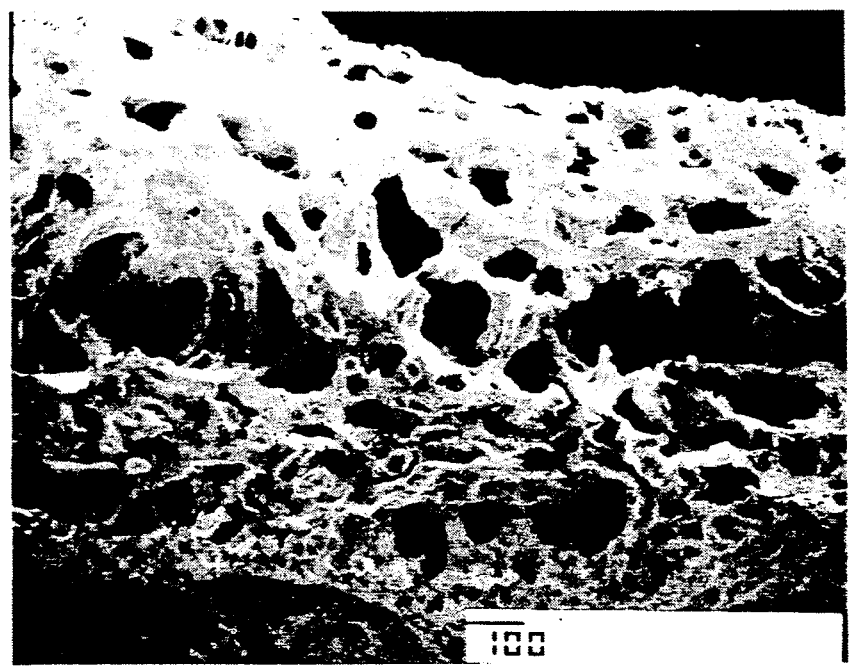
Figure 3:
FIG. 3 is a cross-sectional view at 75X magnitude of the physical structure of a corn-based chip according to this invention. A scale bar of 100 microns is shown in the lower portion of the Figure.
Figure 4:
FIG. 4 is a cross-sectional view at 75X magnitude of the physical structure of a wheat-based chip according to this invention. A scale bar of 100 microns is shown in the lower portion of the Figure.

Conventional corn chips and tortilla chips are texturally heavier than chips of the present invention. One explanation for this textural difference is found in the physical structure of the chips. As can be seen from FIGS. 1 and 2, conventional chips typically have a cell wall thickness of from about 20 to about 100 microns. As is evident from FIGS. 3 and 4, the chips of the present invention typically have a cell wall thickness of from about 1 to about 30 microns. Additionally, the typical void sections, aside from the extremely large cavernous voids, in a conventional chip range from about 10 to about 50 microns. In chips of the present invention, the typical void section is from about 30 to about 100 microns. This combination of thinner cell wall thickness, and larger void size, causes chips of the present invention to be texturally lighter or more lubricious than conventional chips.

Chips that have a higher degree of lubricity tend to become undesirably mushy upon mastication. Generally, a desirable cereal-based snack chip has a lesser degree of toughness, that is, a desirable chip is lighter, more lubricious, and quickly breaks up in the mouth without losing its crunch and becoming mushy.

All three aspects of snack chip texture are useful in describing different characteristics of any cereal-based snack chips. In many instances, the three aspects of snack chip texture act inapposite with each other. For example, traditionally corn chips are undesirably gritty and have a low degree of lubricity; that is, they are hard and tough and they do not melt in the mount quickly. They are typically very high in fat and are therefore greasy, too. To produce a corn chip with a high degree of lubricity, one may have to sacrifice the desirable crunchy attributes.

The problem thus becomes one of trying to develop a snack chip that is texturally light, lubricious, and breaks up easily in the mouth; yet, at the same time remains crunchy to chew (i.e. does not become mush upon chewing) and does not contain a high amount of fat. A snack chip that is texturally light, and breaks up easily in the mouth, but does so at the expense of its crunchiness is perceived as a soggy and mushy chip and is undesirable. Thus, it is desirable to balance the desirable crunchy aspects of texture against the undesirable toughness aspects.

The intermediate compositions of this invention, upon frying in oil, produce novel, unique, snack chips that are crisp, with a light texture, a high degree of lubricity, yet still retain a crunchiness not normally associated with light, lubricious chips. Typical corn tortilla chips contain approximately 30% by weight of fat. Typical corn chips contain approximately 40% by weight of fat. Typical potato chips also contain about 40% by weight of fat. Chips of the present invention, on the other hand, contain from about 10% to about 35% by weight of fat, preferably from about 15 to about 25% by weight of fat. The snack chips are lower in fat content and higher in fiber than traditional corn, potato, or tortilla chips.

This is accomplished through the implementation of unique process conditions which control starch gelatinization, dextrinization, and final chip structure, plus optional incorporation of specific emulsifiers into the compositions, and optional incorporation of a unique absorbent material into the compositions.

Starting Materials

The first step in producing the snack chips and compositions according to this invention is to select the proper cereal for use in the dough. As used herein, the term "cereal" means the farinaceous food products of grain plants. Thus, the term comprises materials such as corn kernels and corn flour, wheat kernels and wheat flour, rice seed and rice flour, rye, oat, barley, and tapioca or cassava. Cereals and cereal products are especially useful as starting feed materials in this invention because they contain high quantities of starch. In addition to cereals as starting materials, other starch-containing materials, such as potato starch or potato flour, soy beans, and peanuts, can be used as feed materials or as a component of the feed material. Of particular interest to this invention are corn or wheat snack chips and chips made from predominantly corn- and wheat-based compositions.

When producing a cereal-based snack chip, it has been found that many variations and types of cereal can be used in this invention. However, of particular interest are corn kernels of the yellow or white dent type, and wheat kernels of the red or white variety. In addition, corn or wheat flour or grits can be used to supplement or in place of dry, fresh corn or wheat.

If a corn chip product is desired, and corn is used as the starting material, it can be dry, fresh, whole kernel corn, partially pre-cooked corn kernels, or ground corn flour. The present invention eliminates the time-consuming traditional cooking and steeping stages that are necessary to soften the corn hulls for removal and to gelatinize the corn starch. Instead, as described more fully below, the starting corn kernels with hulls intact are simply mechanically reduced in size by any conventional means to small particles and then introduced with the other starting materials into the feed end of a cooking extruder. Leaving the hulls on the kernels results in a snack chip which is higher in fiber content than traditional snack chips. Cooking the corn particles directly in the extruder results in significant time and energy savings over traditional processes. Additionally, the removal of the cooking and steeping stages significantly reduces the cooking and boiling away of desirable corn flavors and aromas and thus permits the resultant corn chip to attain the strong flavor and aroma of fresh roasted corn. On the other hand, cooked and steeped corn tends to result in the lime soaked flavor of traditional corn or tortilla chips.

After choosing the starting cereal material, the first step is to mechanically reduce the size of the feed particles. Any method of commutation is suitable. The resultant particle size should be such that from about 40% to about 70% by weight is retained on or above a No. 60 size mesh screen. Particularly suited to this invention are stone grinding, slicing, and hammer milling techniques.

The feed materials can be pretreated using conventional methods depending on the effect desired. For instance, the feed materials can be toasted, soaked in water and lime, and the like for developing different flavors. Pretreatment can occur either prior to or after commutation.

After being reduced in size, the feed particles are fed into a cooking extruder, preferably, the first of a series of extruders. One extruder is mandatory, but several sequential extruders can also be used. It can easily be seen by one skilled in the use of extruders how such modifications can be used.

Also added into the cooking extruder using the same or separate feed streams are water and, if desired, other minor flavorants and colorants. Optionally added are an absorbent material, described in detail below, which increases the crunchiness of the resultant chip; emulsifiers, described in detail below, which enhance the crunchy texture of the chip; and an alkaline material which enhances the flavor.

The extruder system acts as ingredient mixer, mixture cooker, gelatinizer, recycle mixer, and composition former. Each of these functions can be accomplished in the same cooking extruder. However, it is preferred that at least two extruders arranged in series are used. The initial extruders serve to mix the ingredients, heat the mixture, impart both heat and mechanical work input to the feed, and substantially cook the mixture. The later extruders serve to incorporate a recycle stream if one is used, and prepare the mixture into an extrudate having the desired attributes to produce a crisp, crunchy, texturally light chip upon frying.

Extrusion cooking mixes and kneads the components, feed particles, water, and minor ingredients into a plasticized mass using both thermal and mechanical work input. The work input enhances hydration and gelatinization of the starch granules in the feed. Extrusion mixing and cooking imparts thermal, mechanical and compression-type work to the feed material causing the rupture and gelatinization of the starch granules in the feed. The work input in the cooking extruders gelatinizes the starch in the feed to provide at least about 60% gelatinization of the starch, preferably at least about 80% gelatinization of the starch. At the same time, sequence and types of work input regions are carefully selected to minimize dextrinization of the starch.

Generally, any cooking extruder can be used as the initial extruder. Single screw and twin screw co- and counter-rotating extruders are typical. Preferably, a twin screw co-rotating extruder having several sequential temperature zones is used. Suitable extruders are either available from or can be designed by The Baker Perkins Company in Peterborough, England or by Werner & Pfleiderer of Stuttgart, West Germany and Wenger Extruders in the U.S.

The temperature zones are arranged sequentially so that the feed material enters the first extruder at room temperature, is initially subjected to a temperature of from about 70° C. to about 120° C., is then subjected to a temperature of from about 100° C. to about 200° C., subjected to a final temperature of from about 90° C. to about 120° C., and finally exits the last extruder to the next process step.

The number of actual temperature zones in the cooking extruders is not critical; rather, the overall temperature profile and the work input in each temperature zone are the keys to producing an extrusion product having the attributes which will produce a crispy, crunchy, texturally light chip. It is preferred that the feed materials enter the first extruder at a temperature of from about 15° C. to about 25° C., are initially subjected to a temperature of about 95° C. to about 115° C., are subsequently subjected to a temperature of about 120° C. to about 160° C., and are finally subjected to a temperature of about 100° C. to about 115° C. This temperature profile can be accomplished using several incremental zones, or can be accomplished using as little as three constant temperature zones. One or more extruders can be used.

Each of the temperature zones can be further broken down into a series of work input regions which perform a specific function on the materials. These regions can be defined as conveying regions, low work input mixing regions, or high work input mixing and kneading regions. Simply stated, the conveying regions merely transport the materials, the low work input mixing regions act to uniformly mix the ingredients without major disruption of the starch granular structure, and the high work input mixing and kneading regions act to cause water absorption, starch gelatinization, and plasticization of the mass. The combination of work input and temperature cause a unique intermediate product to form.

If using a single cooking extruder, or a cooking extruder followed by a recycle extruder, it has been found that it is desirable to delay the major portion of starch gelatinization until late in the cooking extruder, or until just prior to the addition of the recycle. If using several sequential extruders, it is desirable to perform most of the cooking and starch gelatinization in the initial extruders and utilize the later extruders as recycle mixers and extrudate formers. The description below is directed to a process using a single cooking extruder followed by a second extruder for mixing recycle back into the extrusion stream from the cooking extruder. It is readily seen how the cooking extruder can be replaced with several consecutive, sequential extruders which can accomplish the same result. It is also readily seen how the same results can be accomplished using only one extruder and no recycle stream.

To produce an intermediate composition having the desired attributes, the initial temperature zones in the cooking extruder mainly comprise conveying and lower work input mixing regions. Thus, in the initial temperature zones, the material resembles a damp, yet mostly still powdery or granular, mixture of feed materials that have not yet formed a coherent, gelatinized, plasticized mass. As the materials travel further down the length of the cooking extruder, the cereal begins to cook, the dry ingredients begin to absorb water, the work input begins to rupture the starch granules in the cereal, and the materials begin to form a plasticized mass. As the mass enters the later stages of the cooking extruder, it is desirable to increase the amount of work input to cause the materials to form a highly gelatinized mass. However, care must be taken to increase the work imparted to the mass without causing excessive dextrinization of the starch.

The conveying regions generally comprise screw type extruder elements which transport the materials to the next region. Generally, relatively little mechanical work is imparted by a conveying region; instead, the majority of work input in these regions is thermal. The lower work input regions generally comprise kneading blocks located in the extruder barrel at such angles and locations so as to cause some mixing, kneading, and starch granule rupture. The higher work input regions generally comprise kneading blocks located in the extruder barrel at such angles and locations so as to cause a high degree of mixing, kneading, and starch granule rupture. However, under high pressure and temperature, simple conveying regions can impart high work input to the mass.

Extruder screw speeds as low as about 150 revolutions per minute and as high as about 400 revolutions per minute can be used. However, the first extruder is typically operated at about 200 to about 300 revolutions per minute. This typically results in a pressure at the exit of the first extruder of from about 200 psi to about 2000 psi depending on the feed rate of dry material and die design. It is preferred that the exit pressure of the first extruder is from about 500 psi to about 1400 psi.

The feed particles, water, and minor ingredients are added to the cooking extruder in amounts such that upon exiting the extruder the composition comprises from about 60% to about 90% by weight of feed material, and from about 10% to about 40% by weight of water; preferably from about 70% to about 85% by weight of feed material, and from about 15% to about 30% by weight of water.

As the ingredients enter the cooking extruder, they initially become finely mixed into a damp powdery mixture. As the ingredients travel through the extruder zones, the temperature, work input, heat generated, and pressure, all combine to cause water absorption, rupture some of the starch granules, gelatinize the starch, and consequent thickening of the mass so that upon exiting the last extruder, the composition is a plasticized mass capable of being formed into a sheet or cut into individual pieces.

The total extrusion process is largely dependent upon the equipment selected. However, typically it takes from about 0.5 minutes to about 5.0 minutes average residence time. Generally, the residence time in the later extruders where extrudate and recycle streams are mixed comprises from about 10% to about 70% of the total extruder time.

The mixture exits the last zone of the cooking extruder as a plasticized mass. It can be fried into the finished product. However, typically, due to process design process design steps whereby the cutting of individual dough pieces results in excess material for recycle, the mass is introduced into a second, low work input extruder whereby it can be thoroughly mixed with the recycle stream.

If only one extruder is used, the recycle stream can be introduced virtually at any stage of the extrusion process. If a second extruder is used, it is most convenient to introduce the recycle stream at the entrance to the second extruder. Prior to reintroduction, the recycle material is either cut, milled, or ground into small pieces. The two streams are mixed in the second extruder using sufficient work input to create a substantially well-mixed extrudate. The ratio of cooking extruder product to recycle stream is generally from about 90:10 to about 30:70, preferably about 50:50.

The second extruder does not substantially affect the properties of the extrudate of the first extruder. Rather, its function is to mix the extrudate thoroughly with the powdered recycle stream. Thus, the design of the second extruder is not critical. It should be capable of transporting the entire stream, cause thorough mixing, maintain sufficient temperature to maintain a soft extrudate, yet not impart a high degree of work energy to the mass. Generally, a temperature of from about 80° C. to about 110° C., preferably about 90° C., is sufficient when mixing recycle back into the extrudate.

As the mixture exits the second extruder it remains in the form of a highly gelatinized plasticized mass. As the mass exits the extruder some of the water turns to steam and causes the mass to expand or bubble. This expansion is desirable to a certain minimum and maximum degree. For example, it has been found that the expanded cellular structure contributes to the overall textural lightness of the resultant fried chip. If the expansion is too little, then the fired end product is hard and glassy and texturally tough. However, if the expansion is too great, then the chip absorbs too much oil upon frying and produces a greasy, mushy, undesirable product.

It is desirable to specify a range of expansion which will produce a desirble end product. The range of expansion can be defined several ways.

One method of defining the expansion of the extrudate is in terms of the size of the extruder die plate exit holes through which the extrudate passes. Using this method of definition, the cross-sectional area of the extrudate ropes should be from about 1.5 times to about 36 times the cross-sectional area of the extruder die plate exit holes. Various die hole designs will cause different expansions.

The high degree of gelatinization and the expansion that occurs causes a light, easily masticated texture in the final chip. This causes the chip to be easily broken down when chewed. However, one consequence of this lighter texture can be the absorption of oil and the loss of crunchy texture upon chewing.

Thus, to produce a texturally light chip that retains a crunchy texture, one or more of several process and/or compositional modifications can be performed to increase the crunchy texture of the chip.

One method of increasing the crunchy texture of the final chip, and causing the breakdown time to increase, without sacrificing the light texture of the chip, is to add one or more emulsifiers to the cooking extruder as starting materials.

The emulsifiers added into the first extruder with the cereal particles and water are selected from the group consisting of distilled mono- and diglycerides, succinylated monoglycerides, diacetyl tartaric acid esters of monoglycerides, polyglycerol esters of fatty acids, fatty acid esters of sucrose, and mixtures thereof.

The emulsifiers can be added in powdered or liquid form, typically through the use of a separate feeder into the feed end of the first extruder. These emulsifiers and their mixtures produce effects on the texture of the snack chip. Different combinations of these emulsifiers produce different effects. To create a hard, crunchy texture, the most preferred emulsifier combination is a blend consisting essentially of succinylated monoglycerides (SMG) and distilled monoglycerides (DMG) in a weight ratio of SMG:DMG of from about 80:20 to about 20:80. Particularly suitable is a 60:40 blend of SMG:DMG which is commercially available from Eastman Chemical Products under the name of Myvatex DoControl ®.

The amount of emulsifiers to add should be sufficient to comprise up to about 1.0% by weight of the total amount of material entering the first extruder. Preferably, the emulsifier comprises from about 0.04% to about 0.22% by weight of the total amount of material entering the first extruder.

Another method of increasing final product crunchiness is to add an absorbent material to the starting materials. The absorbent material has been found to contribute to the overall crunchiness and texture of the resultant cereal-based chip. Several fibrous materials were added to the extruder feed. Included in these were corn bran, wheat bran, powdered cellulose, and carboxymethylcellulose. These materials have little or no effect on final chip crunchiness. However, the use of up to about 1.0% by weight of a powdered absorbent material derived from fruit and/or vegetable materials and comprising a) from about 15% to about 60% pectin, said pectin having a degree of esterification of from about 1% to about 45%, and less than about 50% of the pectin being in the form of a divalent metal salt, b) from about 15% to about 80% of a material selected from the group consisting of cellulose, hemicellulose, lignin, and mixtures thereof, c) from 0% to about 1.0% chloroform soluble lipids, d) from 0% to about 10% non-lipid organic materials extractable in a mixture of chloroform, methanol, and water, said mixture having a volume ratio of chloroform:methanol:water of 20:4:1, and e) from 0% to about 6% water-soluble metal salts, causes the final chip to have a slower mouthmelt and a crunchy texture that lasts longer.

The absorbent composition described above is not merely a mixture of the components listed; rather, it is a complex chemical structure based upon pectin-containing fruit and vegetable source materials which are converted into absorbent materials using a relatively simple and inexpensive process. Pectin-containing fruit and vegetable source materials which are suitable as starting materials for the production of the absorbent materials of the present invention contain at least about 15% pectin. Examples include apples, apricots, citrus peels, sugar beets and watermelon rinds. Citrus peels and sugar beet pulp, each of which is a by-product of an important agricultural industry, are available in large quantities and at low cost and are therefore preferred starting materials for the preparation of the absorbent materials of the present invention.

The process for producing the absorbent materials of the present invention is not of import to this invention. Rather, such process has been adequately defined and described in published European Patent Application 137,611 (published Apr. 17, 1985) to Rich. Disclosure in that application is directed to a vegetable absorbent material which is useful in disposable diapers. It has now been found that the same absorbent material is suitable for use in cereal-based chip compositions as an ingredient which enhances the crunchiness of the resultant product.

As stated above, the absorbent material is not merely a mixture of pectin and cellulose or hemicellulose fiber. In fact, it has been found that merely mixing pectin and fiber will have little or no effect on the crunchiness of the snack chip.

The addition of the absorbent material in amounts of up to 1.0% by weight of the total amount of material entering the first extruder, preferably an amount from about 0.40% to about 0.60% by weight, has been found to give the resultant snack chip a slower mouthmelt and a more sustained crunch.

Addition of either or both the emulsifier composition and the absorbent material to the cereal-based composition results in a chip with a very unique texture. The resultant chip retains its initial crispness, and in spite of the high degree of gelatinization which normally causes a chip to dissolve easily in the mouth, it breaks down very slowly in the mouth, the crunchy attributes remain for a prolonged time period, yet, the chip retains its light, non-tough chewing texture.

In addition to the cereal particles, water, emulsifiers, and absorbent material, an alkaline material selected from the group consisting of carbonates, bicarbonates, phosphates, and hydroxides of sodium, potassium, and calcium, and mixtures thereof, can optionally be included in the extruder feed. The alkaline material serves much the same function as the lime in traditional corn masa making processes by contributing to the corn chip flavor. However, while lime in traditional corn chip cooking and steeping processes imparts the traditional corn chip or tortilla flavor, the alkaline material in this process helps impart a distinct fresh roasted taste to corn chips and a toasted taste to wheat chips.

The alkaline material should be added in a quantity such that upon exiting the extruder the pH of the extrudate is between from about 7.0 to about 11.0, preferably from about 8 to about 9. Generally, to achieve this pH range, it is necessary to utilize from about 0.3 to about 1.5 pound of alkaline material for every 100 pounds of total feed. The preferred alkaline material is sodium bicarbonate.

Compositional additions such as the emulsifiers and the absorbent material are not the only ways to produce the uniquely textured final product. Process modifications can also impart textural changes which decrease or eliminate the need for either or both the emulsifiers and the absorbent material, For example, it has been found that changing the amount of recycle will change the crunchiness of the final product. Recycle levels greater than 20% will increase the crunchiness of the final products.

The extrudate can be further defined in terms of another parameter, hereinafter referred to as the Water Solubility Index, or WSI. The WSI is a method of measuring the solubility of a composition in ordinary water under a given set of conditions. A complete description of the WSI method is given by Anderson et al. in an article entitled "Gelatinisation of Corn Grits by Roll and Extrusion Cooking", *Die Starke* 22, No. 4 (1970), at pp. 130–135. It is a parameter which is expressed in terms of a percent of material which is soluble in water, and it is roughly a measure of the amount of breakdown, or degree of dextrinization, of the starch in the material. Starch itself is not highly soluble in water. For example, the WSI of ground corn is about 2 to 4. That is, from 2% to 4% of the ground material is soluble in water. WSI increases with the amount of processing, particularly shear, to which the material is subjected. Conventional corn and tortilla chips tend to have a WSI in the range of from 5 to 10 because they are produced with relatively low shear. Extruded products tend to have a WSI greater than 10 depending on the extrusion conditions. For the products disclosed herein, a WSI in the range of 10 to 25 provides the optimum textural attributes. A WSI in excess of 30 results in products with a reduced crunchy attribute.

The WSI parameter has significant utility to this invention because it demonstrates the vastly different product that these feed materials, and this process, produce versus traditional corn and tortilla chips. The higher WSI exhibited by the present chips is a direct indication of the snack chip's solubility in water, and thus, also reflects the chip's degree of lubricity or mouthmelt. Consequently, the higher WSI chip will also be the texturally lighter chip.

The extruded plasticized mass can be either mill rolled or sheeted and gauged into thin sheets of thickness from about 0.015 inch to about 0.050 inch, preferably into thin sheets of thickness from about 0.022 inch to about 0.035 inch, after which it is cut into individual pieces. As the plasticized mass is formed into the thin sheet, the expanded cellular structure is compressed. However, the expanded cellular structure is not eliminated, it is merely compressed.

At this point, the sheet is cut into individual pieces. The shape and size of the individual pieces is not of great concern and their choice is left to the discretion of the individual.

The excess sheet material is recycled back to the extrusion system. Before it is re-introduced into the extruder, it is cut, milled, or ground into small pieces. Size is not important, so long as the particles are small enough to be easily introduced into the extruder.

Regardless of how the sheet is cut, the individual pieces are well-suited for a one or two-step process for producing the final chip. The pieces can be fried either constrained as exemplified in U.S. Pat. No. 3,576,647 to Liepa, or they can be fried unconstrained. The final product shape can be any one of several shapes. Preferred is a uniformly shaped chip which is easily stacked and packaged.

In a one-step cooking process, the pieced are fried in oil at a temperature of from about 350° F. to about 410° F., preferably at a temperature of about 375° F., for a period of from about 5 seconds to about 40 seconds, preferably for a period of about 25 seconds. In a two-step cooking process, the chips are fried as above, but only for a period of from about 5 to about 15 seconds, after which they are then toasted or baked at a temperature of from about 350° F. to about 420° F., preferably at a temperature of about 400° F., for a period of time of from about 2.0 minutes to about 4.0 minutes, preferably for a period of time of about 3.0 minutes. Either chip production process is equally preferred from the standpoint of making acceptable chips. The one-step process may have equipment and process advantages over the two-step process, and is thus preferred from an economical point of view.

The frying can be done in conventional triglyceride oils, or if desired, the frying can be done in low calorie fat-like materials such as those described in U.S. Pat. Nos. 3,600,186; 4,005,195; 4,005,196; 4,034,083; and 4,241,054, incorporated by reference herein.

Exemplary of a noncaloric fat-like material for use as the frying medium is a mixture of the hexa-, hepta-, and octa-esters of sucrose and medium- and long-chain fatty acids obtained from edible fats and oils and/or fatty acid sources that are generally recognized as safe or have been approved for direct food use by U.S. Food and Drug Administration regulations. Fatty acids with chain lengths of 8 to 22 carbon atoms can be used.

A preferred material of this type meets the following specifications:

(1) The total content of octa-, hepta- and hexa-esters is not less than 95 percent.

(2) The content of the octa-ester is not less than 70 percent.

(3) The content of the penta- and lower esters is not more than 3 percent.

(4) Free fatty acid is not more than 0.5 percent.

(5) Residual methyl esters of fatty acids is not more than 0.1 percent.

(6) The residue on ignition (sulfated ash) is not more than 0.5 percent.

(7) The free methanol residue is not more than 10 parts per million.

(8) Arsenic is not more than 1 part per million.

(9) Total heavy metal content (as Pb) is not more than 10 parts per million.

(10) Lead is not more than 2 parts per million.

(11) The viscosity is not less than 15 poise at 100° F. and 10 sec$^{-1}$.

(12) The liquid/solid stability is not less than 90 percent at 100° F.

A noncaloric fat-like material of this type is not only suitable for frying the snack chips of the present invention, but it is also suitable for use in shortenings and oils used to prepare flavored and unflavored fried snacks, such as potato sticks, potato chips (made from fresh or dried potatoes), corn chips, tortilla chips, nacho chips, taco chips, curls, puffs, extruded snacks, shoestring potatoes, potato skins, and other fried snack products.

The shortenings and oils used to prepare the fried snacks typically can contain up to and including 75 percent by weight of the noncaloric fat-like material. These shortenings and oils are preferably supplemented with vitamin E at a level of 1.0 mg d-alpha-tocopherol equivalents per gram of noncaloric fat-like material.

An example of a shortening formula made with the above-mentioned noncaloric fat-like material is as follows: 35% noncaloric fat-like material, 53% liquid triglyceride, 7% hardstock triglyceride, and 5% emulsifier. In particular, preferred noncaloric, fat-like materials of this type will contain not less than 70% of octa-esters. One noncaloric fat-like material of this type is comprised of 93.9% octa-ester, 6.1% hepta-ester, less than 0.1% hexa-ester, less than 0.2% penta-ester, and less than 0.1% tetra- and lower esters. The fatty acid composition of the noncaloric fat-like material of this example is: 13.5% $C_{16}$ (palmitic acid), 41.7% $C_{18}$ (stearic acid), 39.3% $C_{18-1}$ (oleic acid and/or elaidic acid), 3.9% $C_{18-2}$ (linoleic acid), 0.0% $C_{18-3}$ (linolenic acid), 0.4% $C_{20}$ (eicosic acid), and 1.2% of other fatty acids not listed above.

A shortening could also be made with 75% of the above-mentioned noncaloric fat-like material and 25% cottonseed oil; where the fat-like material contains 85.2% octa-ester, 14.8% hepta-ester, less than 0.1% hexa-ester, less than 0.1% penta-ester, and less than 0.1% tetra- and lower esters; and where the fatty acid composition of the fat-like material is: 10.7% $C_{16}$ (palmitic acid), 58.8% $C_{18}$ (stearic acid), 16.4% $C_{18-1}$ (oleic acid and/or elaidic acid), 11.8% $C_{18-2}$ (linoleic acid), 1.1% $C_{18-3}$ (linolenic acid), 0.5% $C_{20}$ (eicosic acid), and 0.7% other fatty acids not listed above.

The chips can then be salted by any conventional means, and are then packaged.

The final chip comprises from about 65% to about 90% by weight of cereal-based material, from about 10% to about 35% by weight of fat, preferably from about 15% to about 25%, up to about 1.0% by weight of emulsifier, preferably from about 0.03% to about 0.22%, up to about 1.0% by weight of absorbent material, preferably from about 0.40% to about 0.60%, from about 0.5% to about 2.0% by weight salt, and from about 0.2% to about 3.0% by weight of water, preferably from about 0.7% to about 1.5%.

EXAMPLE 1

Two twin screw co-rotating extruders are arranged in series. The first extruder is a Werner & Pfleiderer 30 mm diameter cooking extruder which comprises three consecutive constant temperature zones. The zones are arranged in series, each zone comprising approximately one-third of the total extruder length. The first temperature zone is approximately 110° C. The second temperature zone is approximately 135° C. The third temperature zone is approximately 110° C.

The second extruder is a Werner & Pfleiderer 57 mm diameter recycle extruder which is kept at a constant temperature of approximately 90° C. for the entire length of the extruder.

Screw speed for both extruders is kept constant at about 200 revolutions per minute.

Prior to introduction into the cooking extruder, whole corn kernels with hulls intact are comminuted so that the particle size of the corn particles is such that from about 40% to about 70% remains on or above a No. 60 size mesh screen. The emulsifier is a powdered blend of succinylated monoglycerides (SMG) and distilled monoglycerides (DMG) in a weight ratio of SMG:DMG of about 60:40.

The corn particles are added to the cooking extruder using a K-TRON feeder at a rate of about 45.73 lbs. per hour. The sucrose (about 0.57 lbs per hour), sodium bicarbonate (about 0.40 lbs per hour), emulsifier (about 0.05 lbs per hour), and beta-carotene (about 15 parts per million) are mixed together using corn particles as a carrier, and are then added to the extruder using a K-TRON feeder at a total rate of about 3.55 lbs. per hour with an effective minors rate of about 1.02 lbs. minors per hour. Water is added using a Rotameter at a rate of about 10.29 lbs. per hour. This addition of water in combination with the natural moisture content of the corn particles causes the final moisture content of the material in the cooking extruder to be about 29.00% by weight.

Thus, the percentages of materials entering the cooking extruder are approximately as follows:

| | |
|---|---|
| Corn Particles (wet basis) | 80.72% |
| Added Water | 17.50% |
| Sucrose | 1.00% |
| Sodium Bicarbonate | 0.70% |
| Emulsifier | 0.08% |
| beta-carotene | 15 parts per million |

The materials are passed through the cooking extruder whereby they exit as a plasticized mass. This mass is fed directly into the recycle extruder. Additionally, excess dough from the piece forming steps is comminuted into small particles and fed back into the recycle extruder at a rate such that the feed into the recycle extruder is about 50% extrudate from the cooking extruder and about 50% recycle. The plasticized mass and recycle stream are mixed in the recycle extruder, and exit through die slots or holes. Upon exiting the extruder, the extrudate expands to form a cellular structure.

Due to steam release between the two extruders, and upon exiting the recycle extruder, the composition of the expanded mass comprises about 23% by weight water.

The expanded mass is then mill rolled into a sheet having a thickness of about 0.027 inch. This sheet is then cut into individual pieces. The pieces are placed in a mold having a gap of about 0.064 inch, whereby they are constrain fried for about 25 seconds at about 375° F. (190° C.).

The fat content of the final chips is about 23%.

The chips are then salted, stacked and packed.

EXAMPLE 2

Corn chips are made as in Example 1, except that the chips are fried in a shortening comprising 70% of a sucrose ester noncaloric fat-like material as described above and 30% unhydrogenated cottonseed oil. The noncaloric fat-like material contains 98.3% of fatty acid esters of sucrose, of which 17.7% are hepta-esters. Analysis of the noncaloric fat-like material for fatty acid composition shows the following results: 85.2% octa-ester, 14.8% hepta-ester, less than 0.1% hexa-ester, less than 0.1% penta-ester, less than 0.1% tetra-and lower esters; and 10.7% $C_{16}$, 58.8% $C_{18}$, 16.4% $C_{18-1}$, 11.8% $C_{18-2}$, 1.1% $C_{18-3}$, 0.5% $C_{20}$, and 0.7% others not listed above. The analysis shows 0.04% free fatty acids and less than 0.1% polymer.

What is claimed is:

1. A process for producing an extrusion-cooked snack chip comprising:
   a) comminuting a cereal material which has not been steeped or pre-cooked prior to comminution;
   b) adding the comminuted particles of said cereal material, having only its natural moisture content to a cooking extruder;
   c) extrusion-cooking said cereal material in said cooking extruder at an exit pressure of from about 500 to about 1400 pounds per square inch with added water into a plasticized mass which is a dough comprising from about 70% to about 85% by weight cereal material and from about 15% to about 30% by weight water, said plasticized mass dough having a degree of starch gelatinization of at least about 60%;
   d) forming said plasticized mass dough into a sheet;
   e) cutting said sheet into individual pieces; and
   f) frying said individual pieces into the final snack chip.

2. The process of claim 1 wherein the frying is constrained frying.

3. The process of claim 1 further comprising recycling excess dough from step e), mixing said dough with the extrusion-cooked plasticized mass, and extruding said mixture.

4. The process of claim 1 wherein said extrusion cooking comprises a first extruder with temperature zones arranged in such a manner as to provide a temperature profile in the extruder whereby the initial temperature is from about 80° C. to about 120° C., a middle temperature is from about 100° C. to about 200° C., and a final temperature is from about 90° C. to about 120° C.

5. The process of claim 4 wherein the initial temperature is from about 95° C. to about 110° C., a middle temperature is from about 120° C. to about 160° C., and a final temperature is from about 100° to about 115° C.

6. The process of claim 3 wherein the feed stream into the second extruder comprises from about 30% to about 90% by weight of extrudate from the first extruder and from about 10% to about 70% by weight of recycle stream.

7. The process of claim 6 wherein the feed stream into the second extruder comprises about 50% by weight of extrudate from the first extruder and about 50% by weight of recycle stream.

8. The process of claim 7 wherein the extrudate expands upon exiting the second extruder to a cross-sectional area of from about 1.5 to about 36 times the cross-sectional area of the die plate exit hole.

9. The process of claim 1 wherein the frying is done in a low-calorie fat-like material.

10. The process of claim 9 wherein the low-calorie fat-like material comprises a mixture of the hexa-, hepta-, and octa-esters of sucrose and fatty acids with chain lengths of 8 to 22 carbon atoms.

11. The process of claim 10 wherein the total content of hexa-, hepta-, and octa-esters in low-calorie fat-like material is not less than 95%, the content of the octa-ester is not less than 70%, and the content of the penta- and lower esters is not more than 3%.

12. The process according to any of claims 1-8 or 9-11 wherein the cereal material is corn.

* * * * *